(12) United States Patent
Hung (10) Patent No.: US 8,573,551 B2
(45) Date of Patent: Nov. 5, 2013

(54) FINE-ADJUSTING APPARATUS FOR AN OVERHEAD PROJECTOR

(75) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 261 days.

(21) Appl. No.: 13/222,610

(22) Filed: Aug. 31, 2011

(65) Prior Publication Data

US 2013/0048819 A1 Feb. 28, 2013

(51) Int. Cl.
*E04G 3/00* (2006.01)
*A47H 1/10* (2006.01)
*G03B 17/02* (2006.01)
*G03B 17/00* (2006.01)
*G03B 21/14* (2006.01)

(52) U.S. Cl.
USPC .................. 248/286.1; 248/274.1; 248/279.1; 248/285.1; 248/317; 248/323; 352/242; 352/243; 353/119

(58) Field of Classification Search
USPC ................ 248/274.1, 279.1, 285.1, 317, 323; 312/10.1; 348/373; 352/243; 353/63, 353/119
See application file for complete search history.

(56) References Cited

U.S. PATENT DOCUMENTS

| 2,541,434 | A  | * | 2/1951  | Nelson et al. ................. 248/210 |
| 6,485,144 | B1 | * | 11/2002 | Liao ............................. 352/243 |
| 6,883,920 | B2 | * | 4/2005  | Chen ............................ 353/119 |
| 2004/0211872 | A1 | * | 10/2004 | Dittmer et al. ............... 248/323 |
| 2005/0139742 | A1 | * | 6/2005  | Frisell .......................... 248/317 |
| 2007/0257181 | A1 | * | 11/2007 | Dittmer et al. ............... 248/637 |
| 2009/0294619 | A1 | * | 12/2009 | David .......................... 248/324 |
| 2009/0316118 | A1 | * | 12/2009 | Dittmer ........................ 353/119 |

* cited by examiner

*Primary Examiner* — Joshua J Michener
*Assistant Examiner* — Taylor Morris
(74) *Attorney, Agent, or Firm* — Hershkovitz & Associates, PLLC; Abraham Hershkovitz (57) ABSTRACT

A fine-adjusting apparatus for an overhead projector has a mounting frame, an assembling device, a pitch-adjusting device, a left-right adjusting device and a connecting mount. The mounting frame is adapted to mount on a wall. The assembling device is detachably connected to the mounting frame and has a sliding mount and a base mount. The sliding mount is slidably mounted in the mounting frame. The base mount is pivotally connected to the sliding mount. The pitch-adjusting device is connected to the assembling device and has a pitching frame, a guiding bar and a pitch-adjusting shaft. The left-right adjusting device is connected to the pitch-adjusting device and has an adjusting frame, a left-right adjusting shaft and a linking element. The connecting mount is pivotally connected to the left-right adjusting device, is used to connect with the overhead projector and has a connecting board, two pivot frames and multiple extending arms.

17 Claims, 13 Drawing Sheets

FINE-ADJUSTING APPARATUS FOR AN OVERHEAD PROJECTOR

BACKGROUND OF THE INVENTION

1. Field of the Invention

The present invention relates to a fine-adjusting apparatus, and more particularly relates to a fine-adjusting apparatus for an overhead projector to adjust the slant angle, the pitching angle and the position of the overhead projector easily and multi-directionally.

2. Description of Related Art

An overhead projector is mounted securely on a ceiling or a wall by a mounting frame of a conventional adjusting apparatus. The conventional adjusting apparatus can be used to adjust the angle and position of the overhead projector.

However, the conventional adjusting apparatus only can be used to adjust the slant angle of the overhead projector or the pitching angle of the overhead projector alone, and cannot be used to adjust the slant angle and the pitching angle of the overhead projector at the same time. Then, the conventional adjusting apparatus will limit the adjusting directions of the overhead projector and will influence the projecting effect of the overhead projector.

Therefore, the present invention provides a fine-adjusting apparatus for an overhead projector to mitigate or obviate the aforementioned problems.

SUMMARY OF THE INVENTION

The main objective of the present invention is to provide a fine-adjusting apparatus for an overhead projector that can adjust the slant angle, the pitching angle and the position of the overhead projector easily and multi-directionally.

The fine-adjusting apparatus for an overhead projector in accordance with the present invention has a mounting frame, an assembling device, a pitch-adjusting device, a left-right adjusting device and a connecting mount. The mounting frame is adapted to mount on a wall. The assembling device is detachably connected to the mounting frame and has a sliding mount and a base mount. The sliding mount is slidably mounted in the mounting frame. The base mount is pivotally connected to the sliding mount. The pitch-adjusting device is connected to the assembling device and has a pitching frame, a guiding bar and a pitch-adjusting shaft. The left-right adjusting device is connected to the pitch-adjusting device and has an adjusting frame, a left-right adjusting shaft and a linking element. The connecting mount is pivotally connected to the left-right adjusting device, is used to connect with the overhead projector and has a connecting board, two pivot frames and multiple extending arms.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
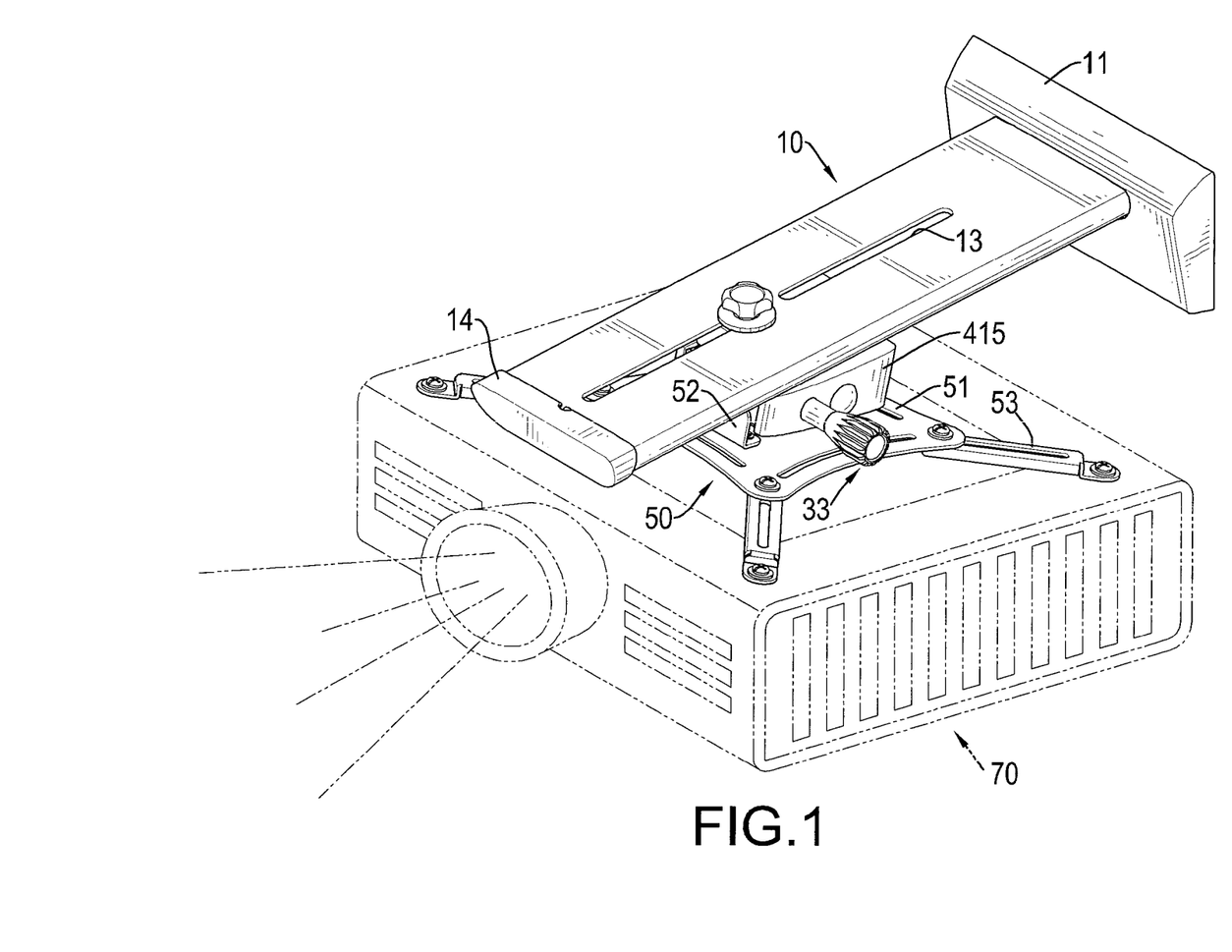
FIG. 1 is a perspective view of a fine-adjusting apparatus for an overhead projector in accordance with the present invention mounted on an overhead projector.
Figure 2:
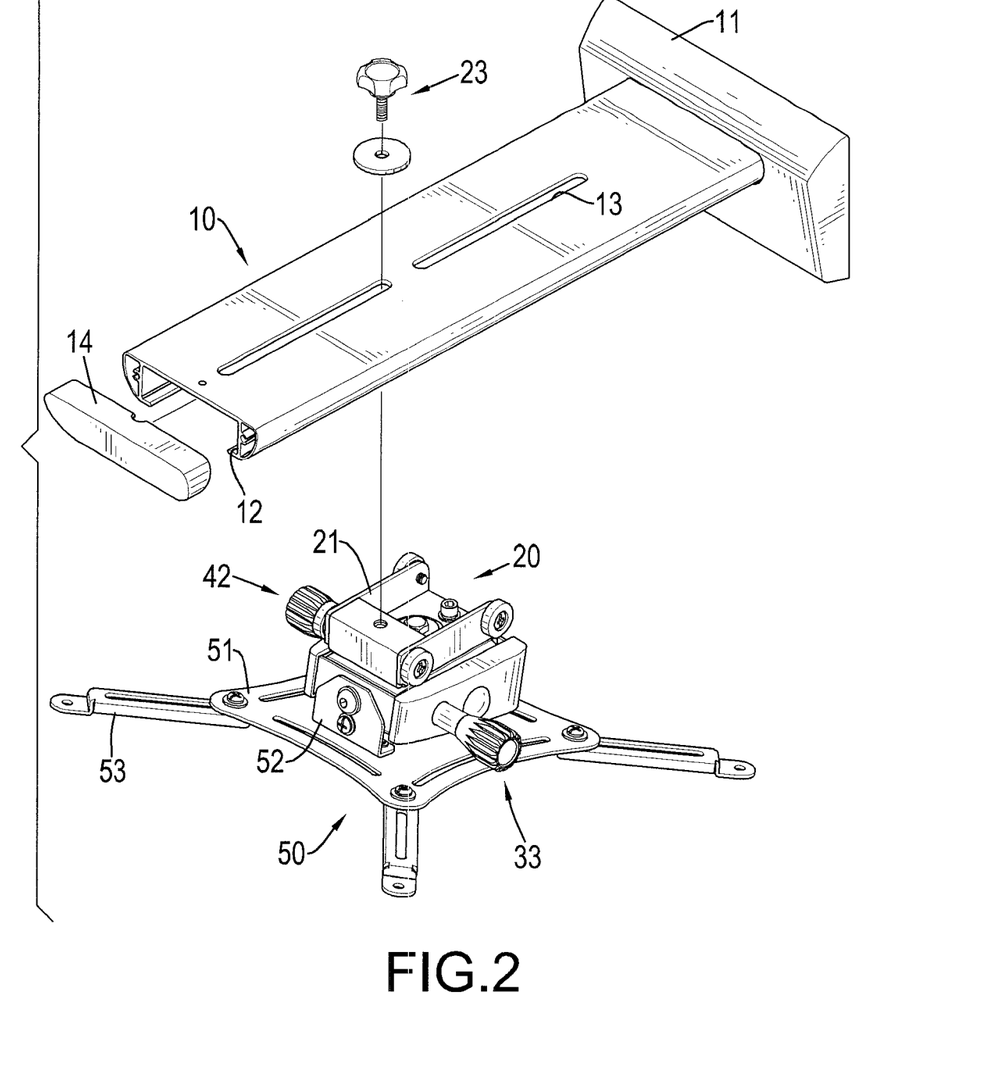
FIGS. 2 to 7 are enlarged exploded perspective views of the fine-adjusting apparatus in FIG. 1.

With reference to FIGS. 1 and 2, a fine-adjusting apparatus in accordance with the present invention for an overhead projector 70 having a top and comprises a mounting frame 10, an assembling device 20, a pitch-adjusting device 30, a left-right adjusting device 40 and a connecting mount 50.

The mounting frame 10 is elongated, is mounted on a ceiling or a wall and has a mounting end, a free end, a bottom, a fixing mount 11, a rail 12, multiple elongated holes 13 and a limiting cap 14. The fixing mount 11 is mounted on the mounting end of the mounting frame 10 and is mounted on the ceiling or the wall to suspend the mounting frame 10. The rail 12 is formed in the bottom of the mounting frame 10 between the ends of the mounting frame 10. The elongated holes 13 are formed through the mounting frame 10 at intervals, align with each other and communicate with the rail 12. The limiting cap 14 is detachably mounted around the free end of the mounting frame 10.

Figure 3:
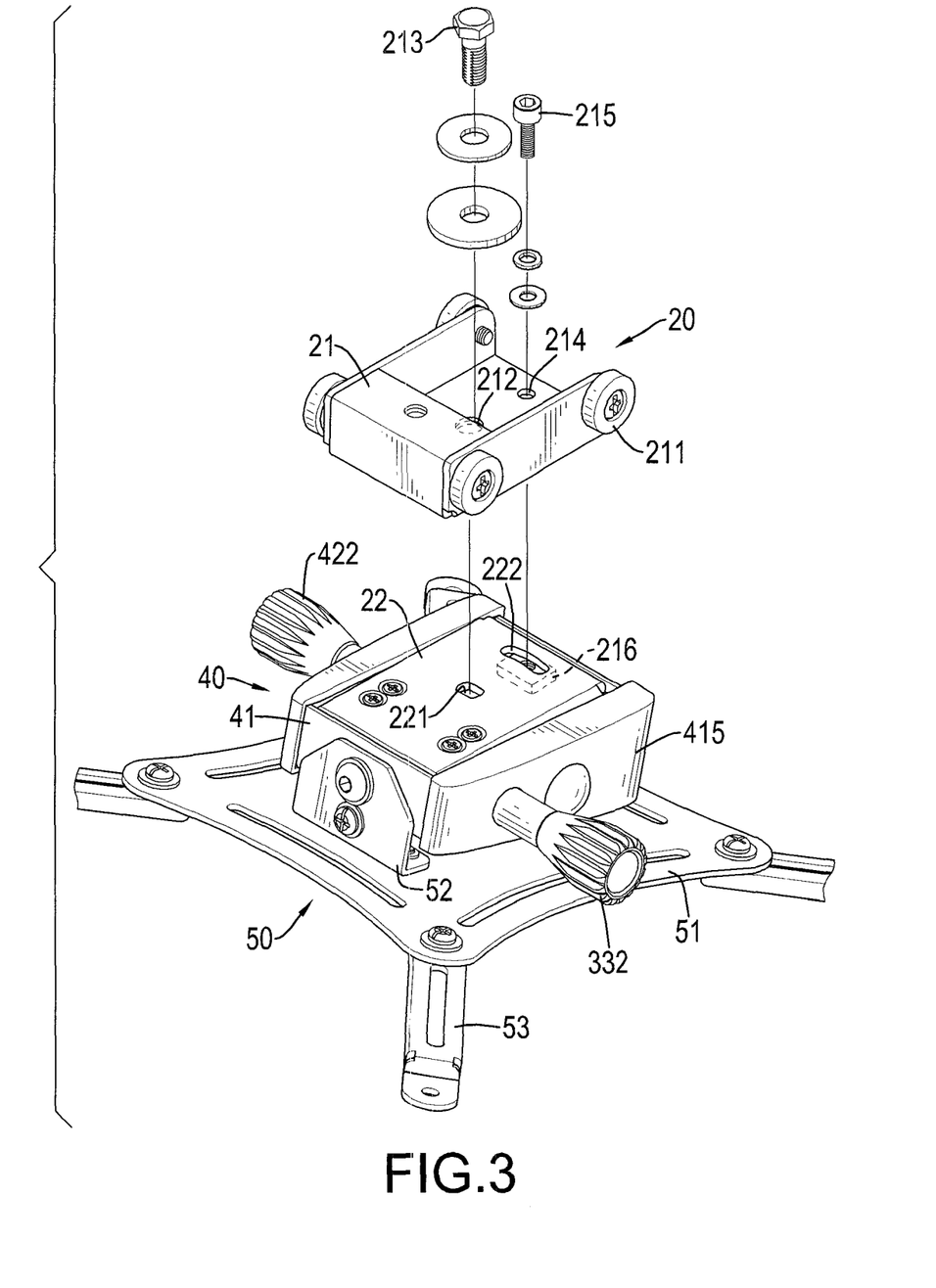
Figure 4:
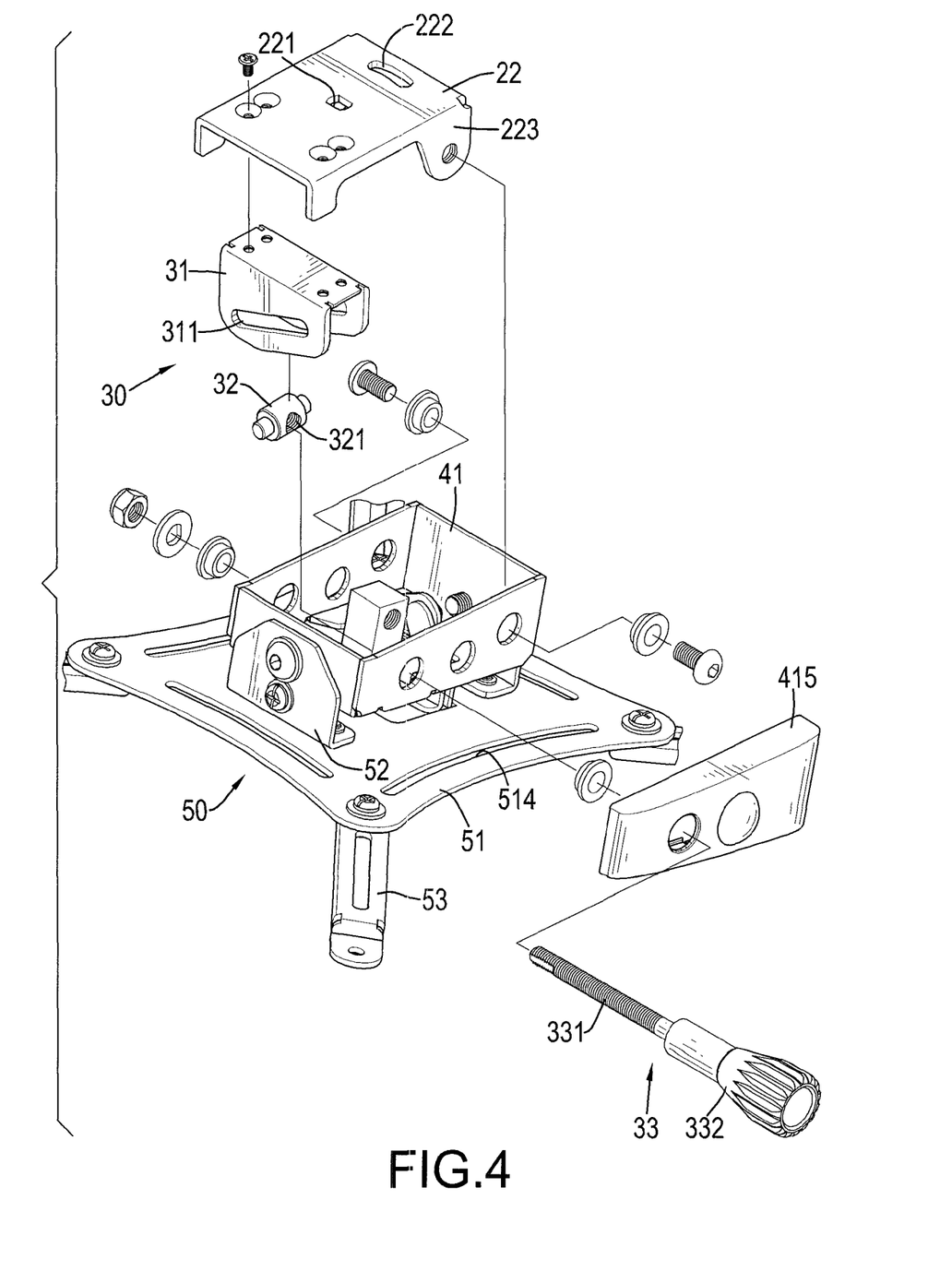
Figure 5:
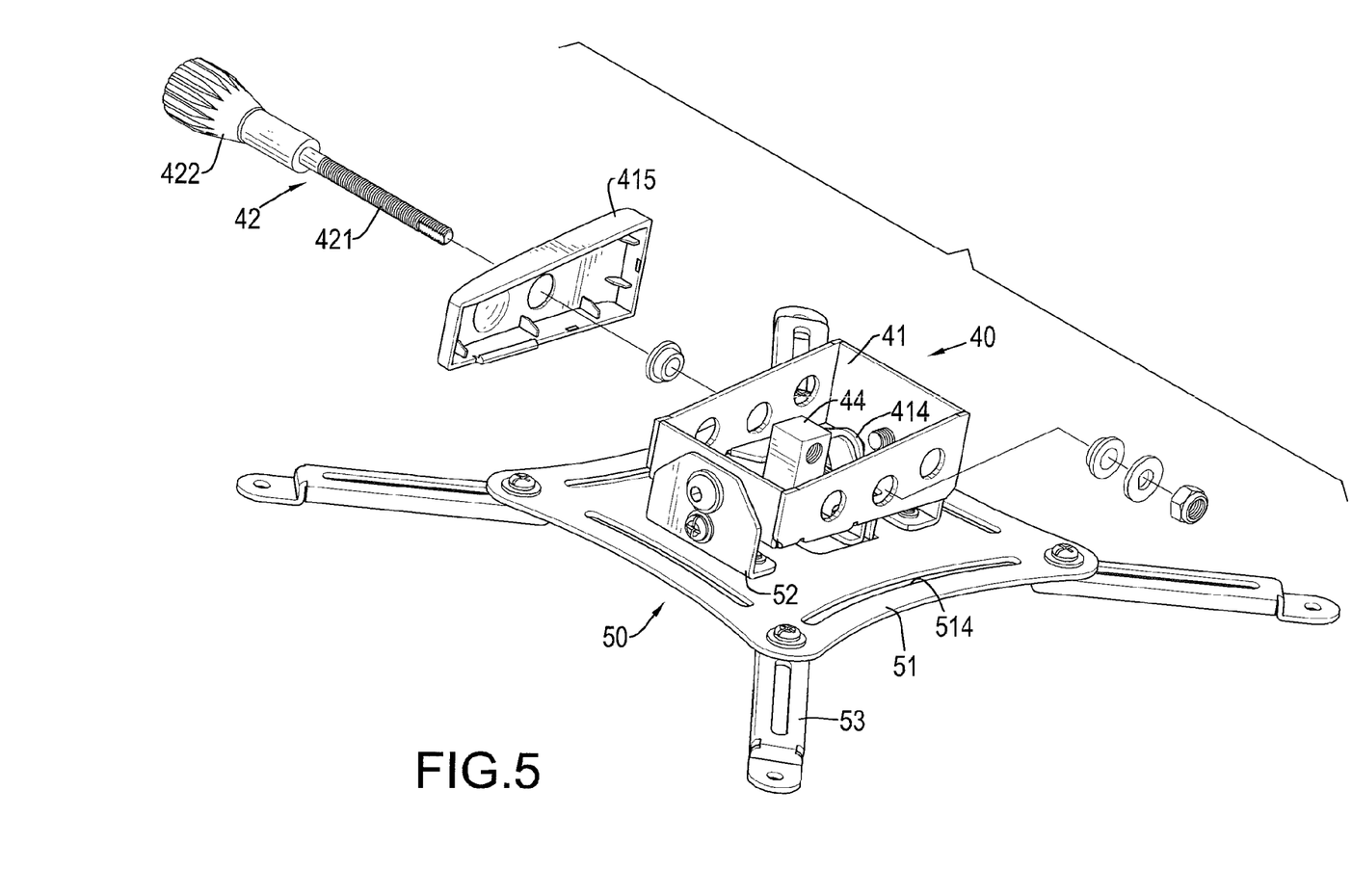
Figure 6:
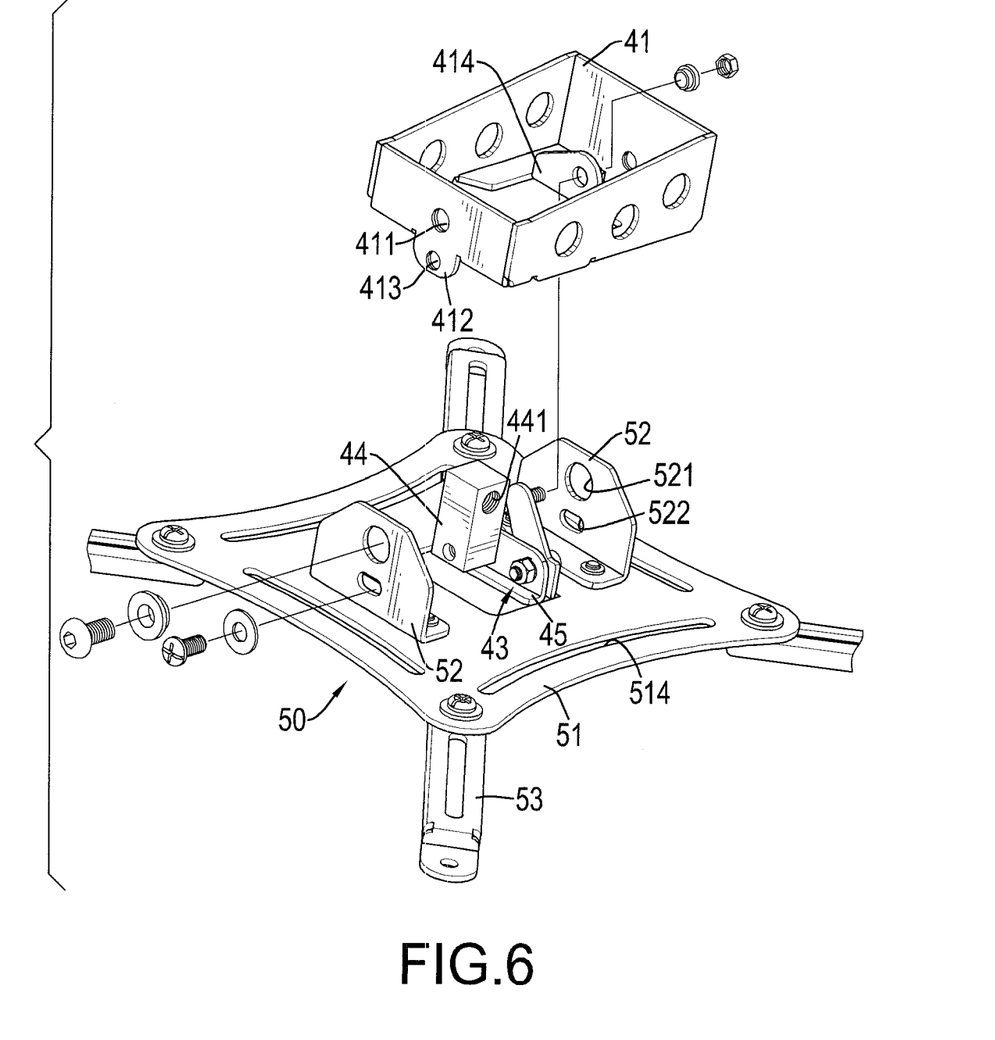
Figure 7:
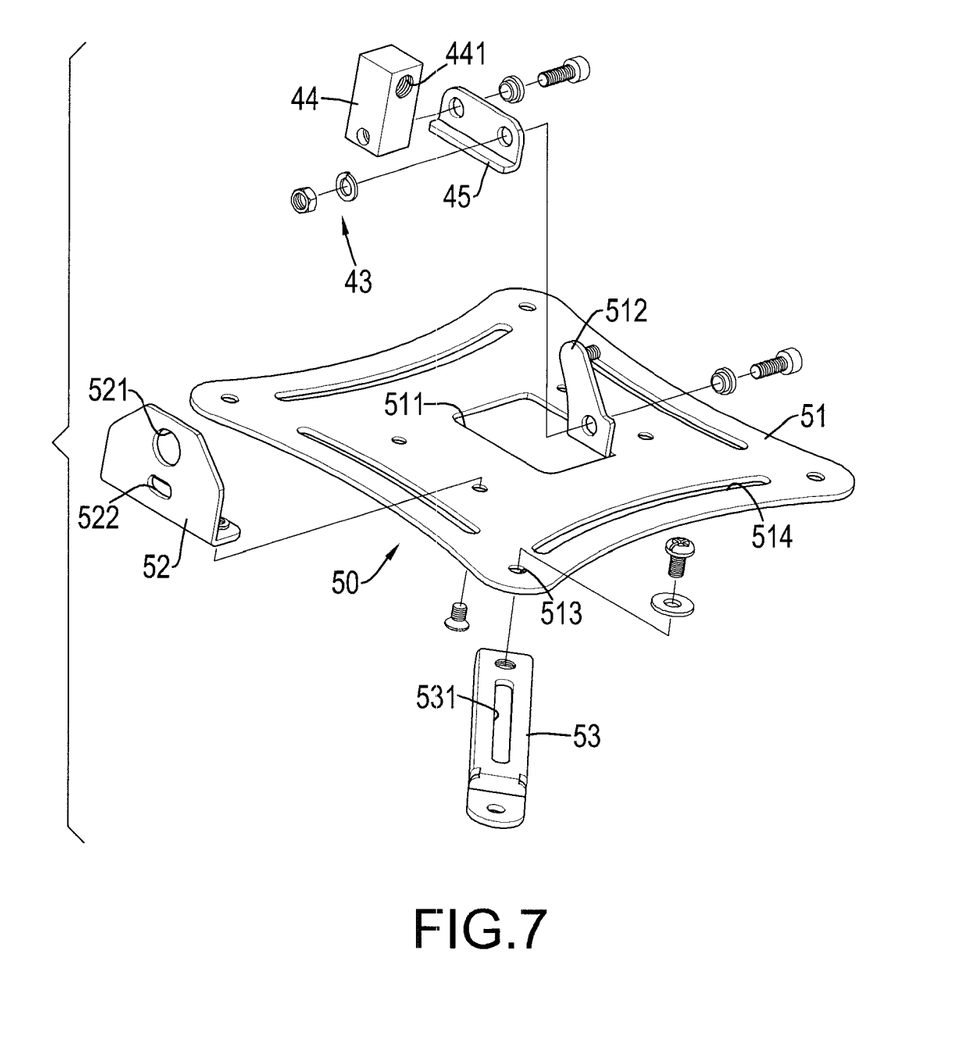

With reference to FIGS. 2, 3 and 4, the assembling device 20 is detachably connected to the mounting frame 10 and has a sliding mount 21 and a base mount 22.

The sliding mount 21 is slidably mounted in the rail 12 of the mounting frame 10 and has two sidewalls, a front end, a rear end, a top, a bottom, multiple rollers 211, a fastener 23, a threaded hole 212, a screw 213, a fixing hole 214, a fixing rod 215 and a holding slab 216. The rollers 211 are rotatably mounted on the sidewalls of the sliding mount 21 and are rotatably mounted in the rail 12 of the mounting frame 10. The fastener 23 extends through one of the elongated holes 13 of the mounting frame 10 and is connected securely to the top of the sliding mount 21 near the front end of the sliding mount 21 to connect the sliding mount securely to the mounting frame 10.

The threaded hole 212 is formed through the bottom of the sliding mount 21. The screw 213 is screwed in the threaded hole 212 and has a lower end extending out of the bottom of the sliding mount 21. The fixing hole 214 is formed through the bottom of the sliding mount 21 near the rear end of the sliding mount 21. The fixing rod 215 is mounted in the fixing hole 214, extends out of the bottom of the sliding mount and has a lower end. The holding slab 216 is connected securely to the lower end of the fixing rod 215 below the bottom of the sliding mount 21.

The base mount 22 may be U-shaped, is pivotally connected to the sliding mount 21 below the mounting frame 10 and has a top, a bottom, two sidewalls, a mounting hole 221, a curved hole 222 and two connecting wings 223. The top of the base mount 22 abuts the bottom of the sliding mount 21. The mounting hole 221 is formed through the top of the base mount 22, aligns with the threaded hole 212 of the sliding mount 21 and is mounted around the lower end of the screw 213.

The curved hole 222 is formed through the top of the base mount 22 and communicates with the fixing hole 214 of the sliding mount 21 to enable the lower end of the fixing rod 215 to extend through the base mount 22 via the curved hole 222 and to connect with the holding slab 216. Then, the base mount 22 is connected to the sliding mount 21 by between the fixing rod 215 and the holding slab 216, and the base mount 22 can be rotated pivotally relative to the sliding mount 21 by the fixing rod 215 being moved along the curved hole 222 of the base mount 22. The connecting wings 223 are respectively formed on and protrude downwardly from the sidewalls of the base mount 22 beside the curved hole 222.

Figure 9:
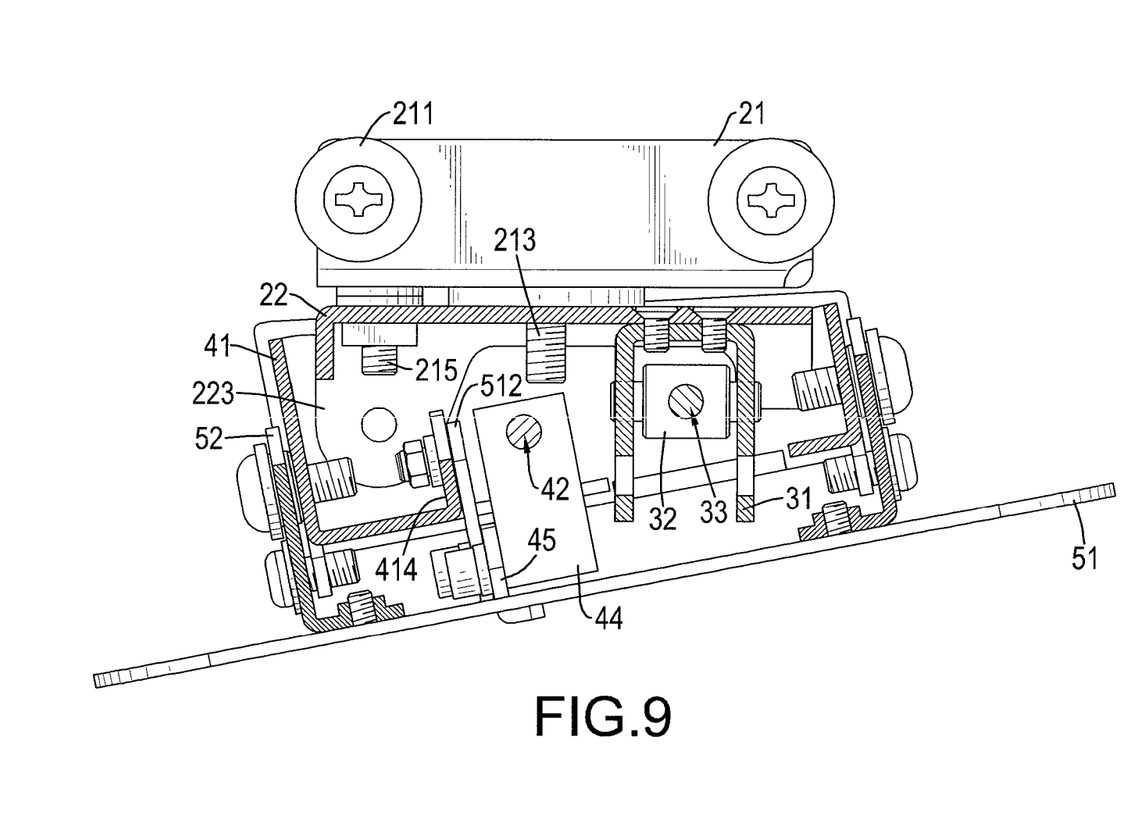
FIG. 9 is another enlarged side view in partial section of the fine-adjusting apparatus in FIG. 1.

With reference to FIGS. 4 and 9, the pitch-adjusting device 30 is connected to the assembling device 20 and has a pitching frame 31, a guiding bar 32 and a pitch-adjusting shaft 33.

The pitching frame 31 may be U-shaped, is securely connected to the base mount 22 opposite to the curved hole 222 and has a top, two free sides and two guiding slots 311. The top of the pitching frame 31 is securely connected to the bottom of the base mount 22 opposite to the curved hole 222. The free sides are formed on and protrude downwardly from the top of the pitching frame 31 and parallel to each other. The guiding slots 331 are respectively and obliquely formed through the free sides of the pitching frame 31 and align with each other.

The guiding bar 32 is slidably connected to the pitching frame 31 between the free sides of the pitching frame 31 and has an external surface, two inserting ends and a screwing hole 321. The inserting ends of the guiding bar 32 are respectively mounted in the guiding slots 331 of the pitching frame 31 to enable the guiding bar 32 to move relative to the pitching frame 31 along the guiding slots 311. The screwing hole 321 is radially formed through the guiding bar 32 between the free sides of the pitching frame 31.

The pitch-adjusting shaft 33 is rotatably connected to the guiding bar 32 and has an external surface, an inner end, an outer end, an outer thread 331 and a rotating button 332. The outer thread 331 is formed on the external surface of the pitch-adjusting shaft 33 between the ends of the pitch-adjusting shaft 33. The rotating button 332 is securely mounted around the outer end of the pitch-adjusting shaft 33.

With reference to FIGS. 4 to 7 and 9, the left-right adjusting device 40 is connected to the pitch-adjusting device 30 and has an adjusting frame 41, a left-right adjusting shaft 42 and a linking element 43.

The adjusting frame 41 may be a hollow-rectangular frame, is connected to the pitch-adjusting shaft 33 of the pitch-adjusting device 30 and the base mount 22 and has two opposite sidewalls, a front side, a rear side, two connecting holes 411, two extending slabs 412, a connecting panel 414 and two cover boards 415. The opposite sidewalls of the adjusting frame 41 are connected to the pitch-adjusting shaft 33 and the connecting wings 223 of the base mount 22. The connecting holes 411 are respectively formed through the sides of the adjusting frame 41 and align with each other. The extending slabs 412 are respectively formed on and protrude downwardly from the sides of the adjusting frame 41 below the connecting holes 411 and each extending slab 412 has a linking hole 413 formed through the extending slab 412. The connecting panel 414 is formed on and protrudes upwardly from the rear side of the adjusting frame 41 and extends into the adjusting frame 41. The cover boards 415 are respectively mounted on the opposite sidewalls of the adjusting frame 41.

The left-right adjusting shaft 42 is rotatably connected to the opposite sidewalls of the adjusting frame 41, parallels the pitch-adjusting shaft 33 and has an external surface, an inner end, an outer end, an outer thread 421 and a rotating button 422. The outer thread 421 is formed on the external surface of the left-right adjusting shaft 42 between the ends of the left-right adjusting shaft 42. The rotating button 422 is securely mounted around the outer end of the left-right adjusting shaft 42.

The linking element 43 is movably connected to the left-right adjusting shaft 42 and has a screw block 44 and a linking board 45. The screw block 44 is movably connected to the left-right adjusting shaft 42 between the opposite sidewalls of the adjusting frame 41 and has a top, a bottom and a setscrew hole 441. The setscrew hole 441 is formed transversally through the screw block 44 near the top of the screw block 44 and is screwed with the outer thread 421 of the left-right adjusting shaft 42. The linking board 45 is connected to the screw block 44 near the bottom of the screw block 44.

With reference to FIGS. 1 and 6 to 8, the connecting mount 50 is pivotally connected to the left-right adjusting device 40, is used to connect with the overhead projector 70 and has a connecting board 51, two pivot frames 52 and multiple extending arms 53.

The connecting board 51 may be a quadrate board, is connected to the adjusting frame 41 and the linking element 43 of the left-right adjusting device 40 and has a center, four corners, a top face, a through hole 511, a linking arm 512, four extending holes 513 and four elongated slots 514. The through hole 511 is formed through the center of the connecting board 51. The linking arm 512 is formed on and protrudes upwardly from top face of the connecting board 51 at a side edge of the through hole 511 and is connected to the connecting panel 414 of the adjusting frame 41 and the linking board 45 of the linking element 43. The extending holes 513 are respectively formed through the corners of the connecting board 51. The elongated slots 514 are formed through the connecting board 51 between the extending holes 513.

The pivot frames 52 are mounted on the top face of the connecting board 51 beside the though hole 511 and are respectively and pivotally connected to the sides of the adjusting frame 41, and each pivot frame 52 has a pivot hole 521, an elongated-curved hole 522 and multiple bolts. The pivot holes 521 are respectively formed through the pivot frames 52 and align with the connecting holes 411 of the adjusting frame 41. The elongated-curved holes 522 are respectively formed through the pivot frames 52 below the pivot holes 521 and respectively align with the linking holes 413 of the adjusting frame 41. The bolts are mounted in the pivot holes 521, the connecting holes 411, the elongated-curved holes 522 and the linking holes 413 of the pivot frames 52 and the adjusting frame 41 to pivotally connect the adjusting frame 41 with the pivot frames 52.

The extending arms 53 are detachably connected to connecting board 51 and are connected to the top of the overhead projector 70, and each extending arm 53 has a proximal end, a distal end and a through slot 531. The proximal ends of the extending arms 53 are respectively connected to the extending holes 513 of the connecting board 51. The distal ends of the extending arms 53 are connected to the top of the overhead projector 70. The through slots 531 are formed through the extending arms 53 between the ends and selectively align with the extending holes 513 or the elongated slots 514 of the connecting board 51 according to the size of the overhead projector 70.

With reference to FIG. 1, when the fine-adjusting apparatus in accordance with the present invention is used to an overhead projector 70, the fixing mount 11 of the mounting frame 10 is mounted securely on a ceiling or a wall and the extending arms 53 of the connecting mount 50 are securely connected to the top of the overhead projector 70. Then, the overhead projector 70 can be suspended on the ceiling or the wall by the fine-adjusting apparatus.

Figure 8:
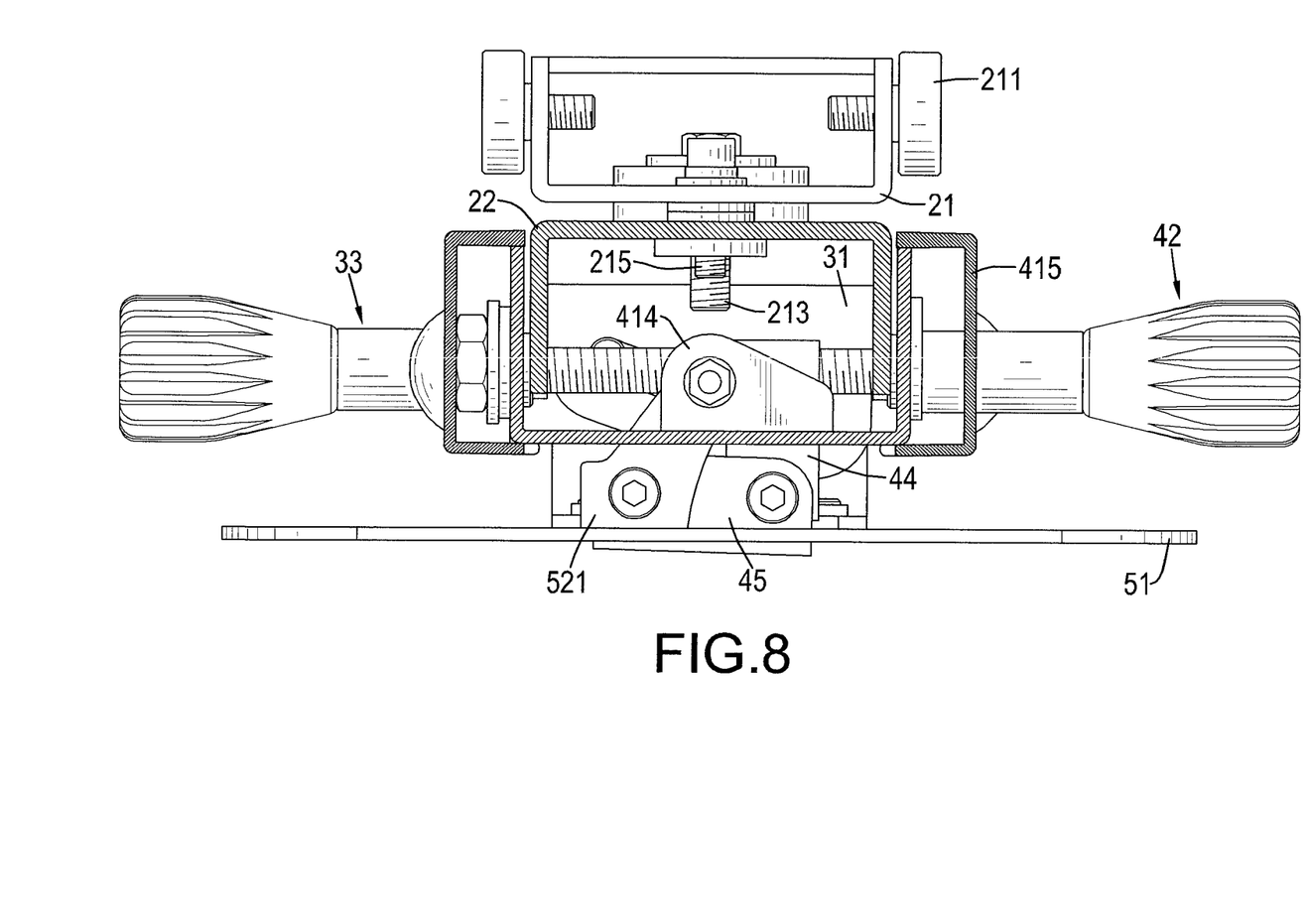
FIG. 8 is an enlarged side view in partial section of the fine-adjusting apparatus in FIG. 1.
Figure 10:
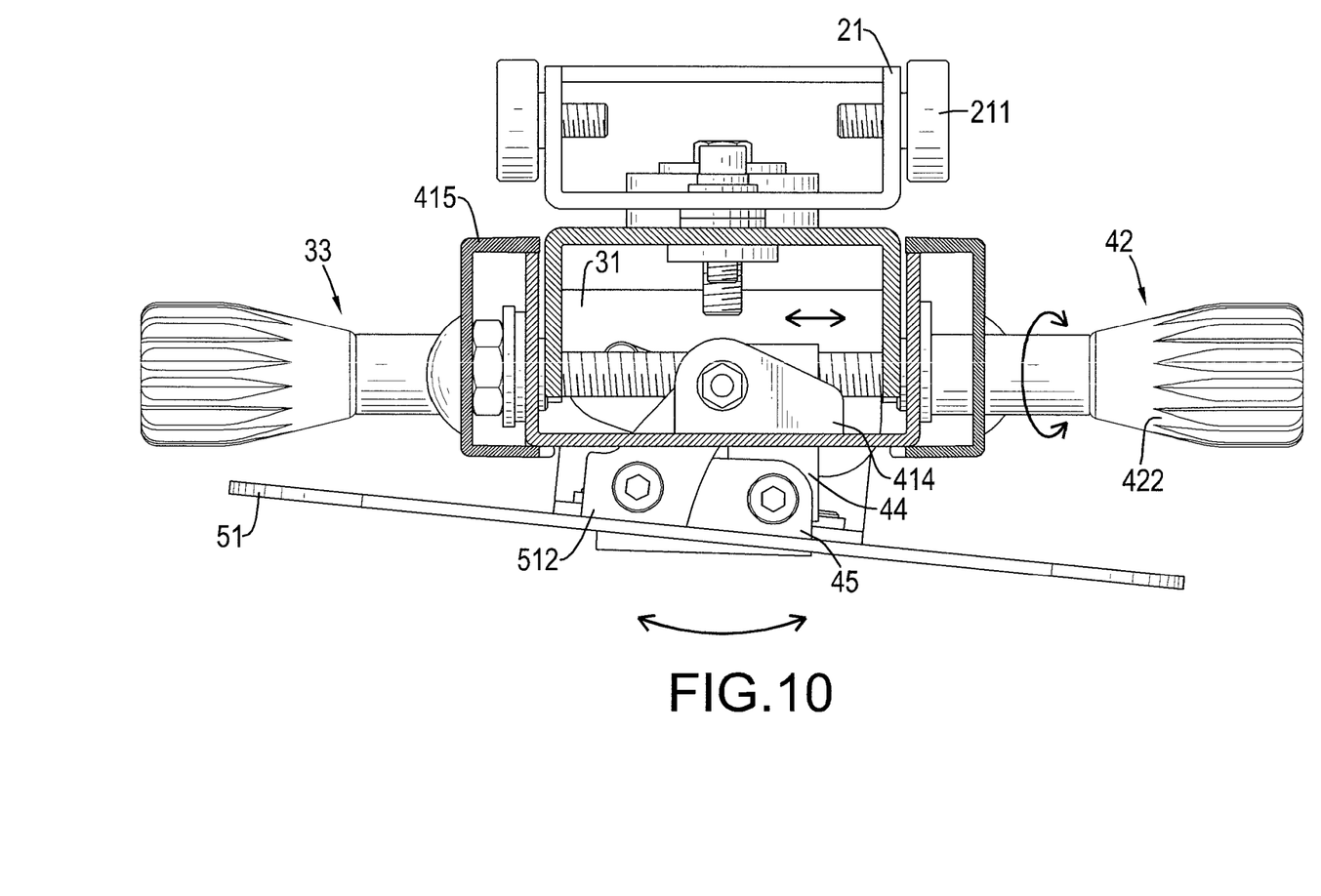
FIG. 10 is an operational side view in partial section of the fine-adjusting apparatus in FIG. 8.

With reference to FIGS. 8 and 10, when a user wants to adjust the slant angle of the overhead projector 70, the rotating button 422 of the left-right adjusting shaft 42 is rotated to enable the screw block 44 to move relative to the sliding mount 21 by the engagement between the outer thread 421 and the setscrew hole 411. When the screw block 44 moves along the left-right adjusting shaft 42, the linking board 45, the linking arm 512 and the connecting panel 414 will be driven and moved by the screw block 44. Then, the connecting board 51 can be rotated aslant relative to the sliding mount 21 to adjust the slant angle of the overhead projector 70.

Figure 11:
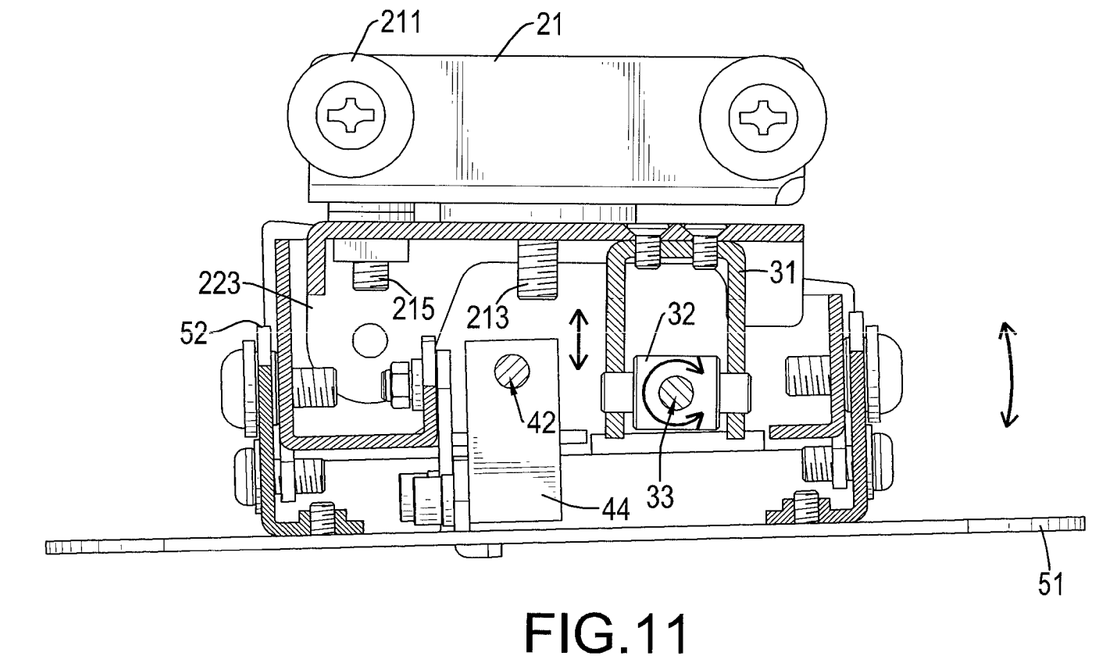
FIG. 11 is an operational side view in partial section of the fine-adjusting apparatus in FIG. 9.

In addition, with reference to FIGS. 4, 9 and 11, when the user wants to adjust the pitching angle of the overhead projector 70, the rotating button 332 of the pitch-adjusting shaft 33 is rotated to enable the guiding bar 32 to move along the guiding slots 311 of the pitching frame 31 by the engagement between the outer thread 331 and the screwing hole 321. When the guiding bar 32 moves along the pitch-adjusting shaft 33, the connecting board 51 will be moved upwardly or downwardly relative to the sliding mount 21 by the connecting structure relationship between the pitch-adjusting shaft 33, the adjusting frame 41 and the connecting board 51. Then, the pitching angle of the overhead projector 70 can be adjusted with the connecting board 51.

Figure 12:
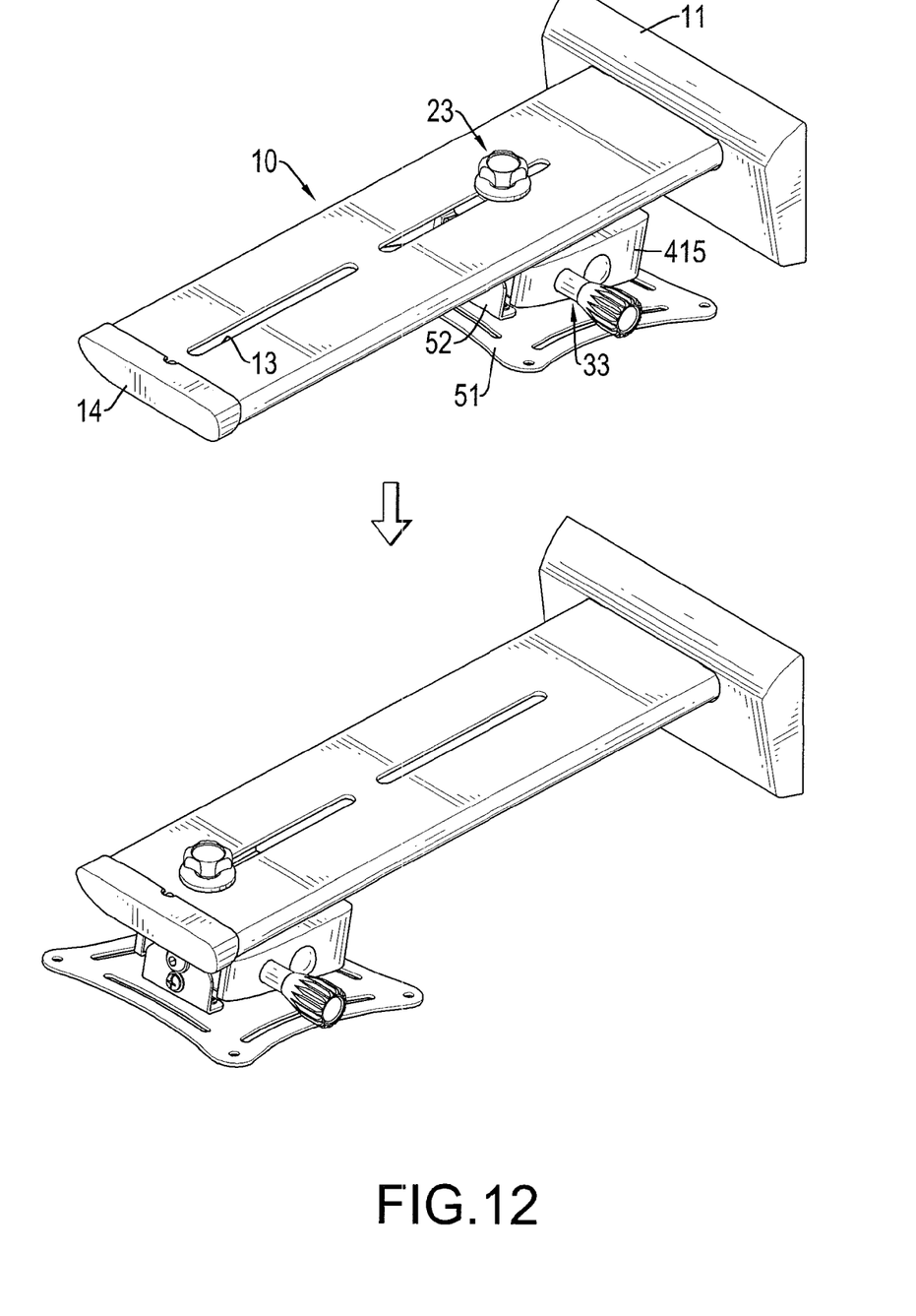
FIG. 12 is an operational perspective view of the fine-adjusting apparatus in FIG. 1.

Furthermore, with reference to FIG. 12, when the user wants to adjust the position of the overhead projector 70, the fastener 23 is loosen from the sliding mount 21 to enable the skidding mount 21 to move relative to the mounting frame 10 by the rollers 211 moving in the rail 12. Then, the position of the overhead projector 70 can be adjusted by the sliding mount 21. When the overhead projector 70 is moved at a desired position, the fastener 23 is securely connected to the sliding mount via a corresponding elongated hole 13 of the mounting frame 10 to hold the sliding mount 21 and the overhead projector 70 securely on the mounting frame 10.

Figure 13:
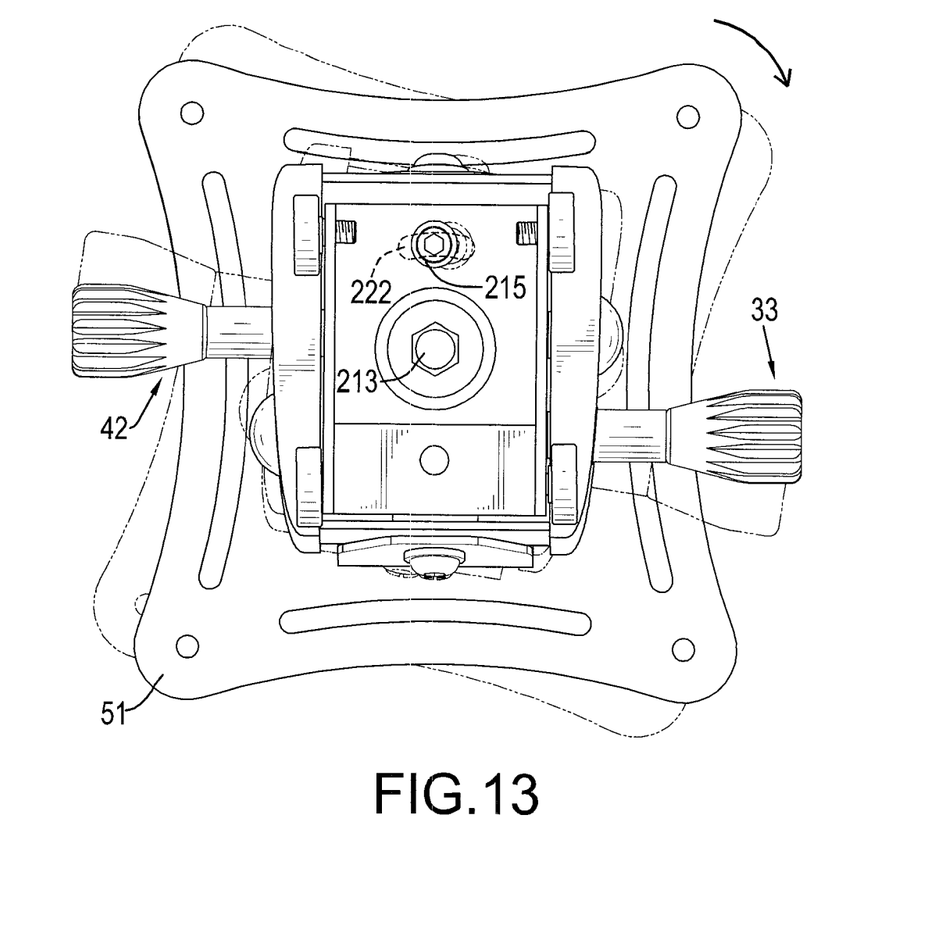
FIG. 13 is an operational top view of the fine-adjusting apparatus in FIG. 1.

Additionally, with reference to FIG. 13, when the user wants to adjust the horizontal direction of the overhead projector 70, the fixing rod 215 is loosen from the holding slab 216 to enable the base mount 22 to rotate pivotally relative to the sliding mount 2l by the fixing rod 215 moving along the curved hole 222 of the base mount 22. Then, the horizontal direction of the overhead projector 70 can be adjusted with the base mount 22 via the connecting board 51.

Consequently, the mounting frame 10, the assembling device 20, the pitch-adjusting device 30, the left-right adjusting device 40 and the connecting mount 50 of the fine-adjusting apparatus in accordance with the present invention can be used to adjust the slant angle, the pitching angle, the position and the horizontal direction of the overhead projector 70 easily and conventionally. Then, the overhead projector 70 can be adjusted at the preferred angel, position and direction to provide an optimum projecting effect to the overhead projector 70.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A fine-adjusting apparatus for an overhead projector having a top, and the fine-adjusting apparatus comprising
   a mounting frame being adapted to securely mount on a wall;
   an assembling device detachably connected to the mounting frame and having
      a sliding mount slidably mounted in the mounting frame and having
         two sidewalls;
         a front end;
         a rear end;
         a top; and
         a bottom; and
      a base mount pivotally connected to the sliding mount below the mounting frame and having
         a top abutting the bottom of the sliding mount;
         a bottom; and
         two sidewalls;
   a pitch-adjusting device connected to the assembling device and having
      a pitching frame securely connected to the base mount and having
         a top securely connected to the bottom of the base mount;
         two free sides formed on and protruding downwardly from the top of the pitching frame and being parallel to each other; and
         two guiding slots respectively and obliquely formed through the free sides of the pitching frame and aligning with each other;
      a guiding bar slidably connected to the pitching frame between the free sides of the pitching frame and having two inserting ends respectively mounted in the guiding slots of the pitching frame to enable the guiding bar to move relative to the pitching frame along the guiding slots; and
      a pitch-adjusting shaft rotatably connected to the guiding bar;
   a left-right adjusting device connected to the pitch-adjusting device and having
      an adjusting frame connected to the pitch-adjusting shaft of the pitch-adjusting device and the base mount of the assembling device;
      a left-right adjusting shaft rotatably connected to the adjusting frame and parallel the pitch-adjusting shaft; and
      a linking element movably connected to the left-right adjusting shaft; and
   a connecting mount pivotally connected to the left-right adjusting device, being adapted to connect with the overhead projector and having
      a connecting board connected to the adjusting frame and the linking element of the left-right adjusting device; and
      two pivot frames mounted on the connecting board and respectively and pivotally connected to the adjusting frame.

2. The fine-adjusting apparatus for an overhead projector as claimed in claim 1, wherein
   the sliding mount has
      a threaded hole formed through the bottom of the sliding mount;
      a screw screwed in the threaded hole and having a lower end extending out of the bottom of the sliding mount;
      a fixing hole formed through the bottom of the sliding mount near the rear end of the sliding mount;
      a fixing rod mounted in the fixing hole, extending out of the bottom of the sliding mount and having a lower end; and
      a holding slab connected securely to the lower end of the fixing rod below the bottom of the sliding mount; and the base mount has
  a mounting hole formed through the top of the base mount, aligning with the threaded hole of the sliding mount and mounted around the lower end of the screw; and
  a curved hole formed through the top of the base mount and communicating with the fixing hole of the sliding mount to enable the lower end of the fixing rod to extend through the base mount via the curved hole and to connect with the holding slab.

3. The fine-adjusting apparatus for an overhead projector as claimed in claim 2, wherein
  the base mount has two connecting wings respectively formed on and protruding downwardly from the sidewalls of the base mount beside the curved hole; and
  the adjusting frame has two opposite sidewalls connected to the pitch-adjusting shaft and the connecting wings of the base mount.

4. The fine-adjusting apparatus for an overhead projector as claimed in claim 3, wherein
  the left-right adjusting shaft is rotatably connected to the opposite sidewalls of the adjusting frame;
  the adjusting frame has
    a front side;
    a rear side;
    two connecting holes respectively formed through the sides of the adjusting frame and aligning with each other; and
    two extending slabs respectively formed on and protruding downwardly from the sides of the adjusting frame below the connecting holes and each extending slab having a linking hole formed through the extending slab; and
  the pivot frames are respectively and pivotally connected to the sides of the adjusting frame and each pivot frame has
    a pivot hole formed through the pivot frame and aligning with a corresponding connecting hole of the adjusting frame;
    an elongated-curved hole formed through the pivot frame below the pivot hole and aligning with the linking hole of the adjusting frame; and
    multiple bolts mounted in the pivot holes, the connecting holes, the elongated-curved holes and the linking holes of the pivot frames and the adjusting frame to pivotally connect the adjusting frame with the pivot frames.

5. The fine-adjusting apparatus for an overhead projector as claimed in claim 4, wherein
  the adjusting frame has a connecting panel formed on and protruding upwardly from the rear side of the adjusting frame and extending into the adjusting frame;
  the left-right adjusting shaft has
    an external surface;
    an inner end;
    an outer end;
    an outer thread formed on the external surface of the left-right adjusting shaft between the ends of the left-right adjusting shaft; and
    a rotating button securely mounted around the outer end of the left-right adjusting shaft;
  the linking element has
    a screw block movably connected to the left-right adjusting shaft between the opposite sidewalls of the adjusting frame and having
      a top;
      a bottom; and
    a setscrew hole formed transversally through the screw block near the top of the screw block and screwed with the outer thread of the left-right adjusting shaft; and
    a linking board connected to the screw block near the bottom of the screw block;
  the connecting board has
    a center;
    a top face;
    a through hole formed through the center of the connecting board; and
    a linking arm formed on and protruding upwardly from top face of the connecting board at the through hole and connected to the connecting panel of the adjusting frame and the linking board of the linking element; and
  the pivot frames are mounted on the top face of the connecting board beside the though hole.

6. The fine-adjusting apparatus for an overhead projector as claimed in claim 5, wherein
  the connecting board has
    four corners;
    four extending holes respectively formed through the corners of the connecting board; and
    four elongated slots formed through the connecting board between the extending holes; and
  the connecting mount has multiple extending arms detachably connected to connecting board to connect to the top of the overhead projector and each extending arm having
    a proximal end connected to one of the extending holes of the connecting board; and
    a distal end being adapted to connect to the top of the overhead projector.

7. The fine-adjusting apparatus for an overhead projector as claimed in claim 6, wherein each extending arm has a through slot formed through the extending arm between the ends of the extending arm and selectively aligning with the extending holes or the elongated slots of the connecting board.

8. The fine-adjusting apparatus for an overhead projector as claimed in claim 7, wherein
  the mounting frame has
    a mounting end;
    a free end;
    a bottom; and
    a rail formed in the bottom of the mounting frame between the ends of the mounting frame; and
  the sliding mount has multiple rollers rotatably mounted on the sidewalls of the sliding mount and rotatably mounted in the rail of the mounting frame.

9. The fine-adjusting apparatus for an overhead projector as claimed in claim 8, wherein
  the mounting frame has multiple elongated holes formed through the mounting frame at intervals, aligning with each other and communicating with the rail; and
  the sliding mount has a fastener extending through one of the elongated holes of the mounting frame and connected securely to the top of the sliding mount near the front end of the sliding mount to connect the sliding mount securely to the mounting frame.

10. The fine-adjusting apparatus for an overhead projector as claimed in claim 9, wherein
  the guiding bar has
    an external surface radially formed through the external surface of the guiding bar between the free sides of the pitching frame; and
    a screwing hole; and the pitch-adjusting shaft has
an external surface;
an inner end;
an outer end;
an outer thread formed on the external surface of the pitch-adjusting shaft between the ends of the pitch-adjusting shaft; and
a rotating button securely mounted around the outer end of the pitch-adjusting shaft.

11. The fine-adjusting apparatus for an overhead projector as claimed in claim 10, wherein
the mounting frame is elongated and has
a fixing mount mounted on the mounting end of the mounting frame to mount on the wall; and
a limiting cap detachably mounted around the free end of the mounting frame; and
the adjusting frame has two cover boards respectively mounted on the opposite sidewalls of the adjusting frame.

12. The fine-adjusting apparatus for an overhead projector as claimed in claim 1, wherein
the connecting board has
four corners;
four extending holes respectively formed through the corners of the connecting board; and
four elongated slots formed through the connecting board between the extending holes; and
the connecting mount has multiple extending arms detachably connected to connecting board to connect to the top of the overhead projector and each extending arm having
a proximal end connected to one of the extending holes of the connecting board; and
a distal end being adapted to connect to the top of the overhead projector.

13. The fine-adjusting apparatus for an overhead projector as claimed in claim 12, wherein each extending arm has a through slot formed through the extending arm between the ends of the extending arm and selectively aligning with the extending holes or the elongated slots of the connecting board.

14. The fine-adjusting apparatus for an overhead projector as claimed in claim 13, wherein
the mounting frame has
a mounting end;
a free end;
a bottom; and
a rail formed in the bottom of the mounting frame between the ends of the mounting frame; and
the sliding mount has multiple rollers rotatably mounted on the sidewalls of the sliding mount and rotatably mounted in the rail of the mounting frame.

15. The fine-adjusting apparatus for an overhead projector as claimed in claim 14, wherein
the mounting frame has multiple elongated holes formed through the mounting frame at intervals, aligning with each other and communicating with the rail; and
the sliding mount has a fastener extending through one of the elongated holes of the mounting frame and connected securely to the top of the sliding mount near the front end of the sliding mount to connect the sliding mount securely to the mounting frame.

16. The fine-adjusting apparatus for an overhead projector as claimed in claim 15, wherein
the guiding bar has
an external surface radially formed through the external surface of the guiding bar between the free sides of the pitching frame; and
a screwing hole; and
the pitch-adjusting shaft has
an external surface;
an inner end;
an outer end;
an outer thread formed on the external surface of the pitch-adjusting shaft between the ends of the pitch-adjusting shaft; and
a rotating button securely mounted around the outer end of the pitch-adjusting shaft.

17. The fine-adjusting apparatus for an overhead projector as claimed in claim 16, wherein
the mounting frame is elongated and has
a fixing mount mounted on the mounting end of the mounting frame to mount on the wall; and
a limiting cap detachably mounted around the free end of the mounting frame; and
the adjusting frame has two cover boards respectively mounted on the opposite sidewalls of the adjusting frame.

* * * * *